United States Patent
Kuowa

(10) Patent No.: US 7,714,545 B2
(45) Date of Patent: May 11, 2010

(54) CONTROLLER OF GENERATOR FOR VEHICLE

(75) Inventor: Tatsuki Kuowa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 347 days.

(21) Appl. No.: 11/916,049

(22) PCT Filed: Aug. 31, 2005

(86) PCT No.: PCT/JP2005/015910

§ 371 (c)(1),
(2), (4) Date: Nov. 30, 2007

(87) PCT Pub. No.: WO2007/026422

PCT Pub. Date: Mar. 8, 2007

(65) Prior Publication Data

US 2009/0033295 A1 Feb. 5, 2009

(51) Int. Cl.
| | |
|---|---|
| H02P 11/00 | (2006.01) |
| H02P 9/00 | (2006.01) |
| H02H 7/06 | (2006.01) |
| H03K 3/017 | (2006.01) |
| H03K 5/04 | (2006.01) |
| H03K 7/08 | (2006.01) |
| H05B 37/02 | (2006.01) |
| H05B 39/04 | (2006.01) |

(52) U.S. Cl. ............................ 322/28; 322/37; 327/175
(58) Field of Classification Search ................... 322/28, 322/36, 37; 327/175; 315/212
See application file for complete search history.

(56) References Cited

U.S. PATENT DOCUMENTS

| | | | | | |
|---|---|---|---|---|---|
| 4,051,421 | A | * | 9/1977 | Brinner et al. | 318/367 |
| 4,256,983 | A | * | 3/1981 | Griffith et al. | 327/101 |
| 4,849,651 | A | * | 7/1989 | Estes, Jr. | 307/125 |
| 5,491,400 | A | * | 2/1996 | Iwatani et al. | 322/28 |
| 5,581,172 | A | * | 12/1996 | Iwatani et al. | 322/28 |
| 5,608,301 | A | * | 3/1997 | Inaniwa et al. | 318/729 |
| 5,731,681 | A | * | 3/1998 | Inaniwa et al. | 318/729 |
| 5,923,095 | A | * | 7/1999 | Iwatani et al. | 307/10.1 |
| 5,942,926 | A | * | 8/1999 | Yamaguchi | 327/156 |
| 6,005,372 | A | * | 12/1999 | Kouwa et al. | 322/25 |
| 6,194,885 | B1 | * | 2/2001 | Oshima | 323/285 |
| 6,194,936 | B1 | * | 2/2001 | Yama | 327/175 |
| 6,204,643 | B1 | * | 3/2001 | Kouwa et al. | 322/28 |
| 6,275,398 | B1 | * | 8/2001 | Sumimoto et al. | 363/89 |
| 6,341,076 | B1 | * | 1/2002 | Kadatskyy et al. | 363/56.12 |
| 6,448,752 | B1 | * | 9/2002 | Umemoto | 323/288 |

(Continued)

FOREIGN PATENT DOCUMENTS

JP        60-065241 A        4/1985

(Continued)

*Primary Examiner*—Julio Gonzalez
*Assistant Examiner*—Pedro J Cuevas
(74) *Attorney, Agent, or Firm*—Sughrue Mion, PLLC

(57) ABSTRACT

A controller of a generator (1) for a vehicle comprising a voltage regulator (3) for regulating a generated voltage to a predetermined voltage by performing on/off control of a field current through a switching element and performing variable control of a regulated voltage with a control signal from an external control unit (4) is further provided with a maximum duty factor limiting circuit (300) for limiting the maximum duty factor of the switching element (Q3) performing on/off control of the field current.

7 Claims, 4 Drawing Sheets

U.S. PATENT DOCUMENTS

| | | | |
|---|---|---|---|
| 6,850,042 B2* | 2/2005 | Kouwa | 322/24 |
| 6,943,532 B1* | 9/2005 | Kouwa et al. | 322/28 |
| 7,173,398 B2* | 2/2007 | Kouwa et al. | 322/8 |
| 7,307,384 B2* | 12/2007 | Lurkens | 315/212 |
| 2002/0185992 A1* | 12/2002 | Kouwa | 322/28 |
| 2005/0219881 A1* | 10/2005 | Lurkens | 363/132 |
| 2006/0145669 A1* | 7/2006 | Kouwa et al. | 322/28 |
| 2008/0030158 A1* | 2/2008 | Shibuya et al. | 318/434 |
| 2008/0068868 A1* | 3/2008 | Williams | 363/21.06 |
| 2008/0157732 A1* | 7/2008 | Williams | 323/266 |
| 2008/0157733 A1* | 7/2008 | Williams | 323/266 |
| 2008/0158915 A1* | 7/2008 | Williams | 363/21.06 |
| 2009/0033295 A1* | 2/2009 | Kouwa | 322/70 |
| 2009/0059630 A1* | 3/2009 | Williams | 363/60 |
| 2009/0206801 A1* | 8/2009 | Kouwa | 322/28 |

FOREIGN PATENT DOCUMENTS

| | | |
|---|---|---|
| JP | 6-197473 A | 7/1994 |
| JP | 07-194023 A | 7/1995 |
| JP | 8-238000 A | 9/1996 |

\* cited by examiner

US 7,714,545 B2

CONTROLLER OF GENERATOR FOR VEHICLE

TECHNICAL FIELD

This invention relates to the controller of a generator for a vehicle, in which an output voltage is regulated on the basis of a control signal level from an external control unit, and more particularly to the controller of a generator for a vehicle, in which the maximum duty factor of a switching element for performing the on/off control of a field current is endowed with a limit in a case where a regulated voltage is controlled with a control signal from the external control unit so as to become higher than a predetermined voltage value.

BACKGROUND ART

FIG. 4 is a configurational diagram showing an example of the prior-art controller of a generator for a vehicle, which has the function of variably controlling a regulated voltage and which is stated in, for example, Japanese Patent No. 3,102, 981.

The controller shown in FIG. 4 illustrates one example of the controller of the generator for the vehicle, which variably controls the regulated voltage to a voltage corresponding to a duty ratio, on the basis of a control signal that continuously and variably controls the regulated voltage at the duty ratio of 0-100% and that has been inputted through a single signal line from an external control unit.

Referring to FIG. 4, numeral 1 designates an AC generator which is driven by an engine not shown, and which is configured of armature coils 101 and a field coil 102. Numeral 2 designates a rectifier which performs the full-wave rectification of the AC output of the AC generator 1 so as to output a rectified voltage from a + side terminal 201 and a − side terminal 202, and numeral 3 a voltage regulator which controls the rectified AC generator output to a predetermined value.

Numeral 4 designates an external control unit, which controls the ON/OFF operation of a transistor Q1 by a control signal (hereinbelow, also termed the "duty signal") that can regulate a duty ratio to be outputted from a transistor 401, to 0%-100%.

One end of an operating resistor 318 is connected to the cathode of a Zener diode ZD3 whose anode is grounded, while the other end of the operating resistor 318 is connected to the plus side terminal of a storage battery 5 through a key switch 8. Numeral 321 designates a charging resistor which is connected to the collector of the transistor Q1, numeral 322 the discharging resistor of a capacitor Ce, and numeral 327 the base resistor of the transistor Q1.

The voltage regulator 3 further includes the following configuration:

More specifically, it includes voltage division resistors 319 and 320 which are connected in series between the voltage detection terminal of the storage battery 5 and the ground; a voltage division resistor 317 which is connected in series with voltage division resistors 310-312 that set reference voltages for comparators CP1 and CP2; a comparator CP3 for controlling an ordinary regulated voltage, which compares a point-F voltage (a voltage divided by the voltage division resistors 319 and 320) that changes depending upon a generated voltage and the reference voltage of a point E as is determined by the values of the voltage division resistors 310-312 and 317, and which outputs an L level signal to a transistor Q3 through a diode D5 and turns OFF the transistor Q3 when (the point-F voltage>the point-E voltage) has held; and a comparator CP4 for controlling a regulated voltage based on an external signal, which compares the point-F voltage and a point-A voltage that is set while being updated by the duty ratio of the duty signal, and which outputs the L level signal to the transistor Q3 through a diode D6 and turns OFF the transistor Q3 when the point-F voltage has become greater than the point-A voltage on that occasion.

Besides, it includes a transistor Q4 which is fed with an H level signal through its base resistor 326 and performs an ON operation when the outputs of the comparators CP1 and CP2 are both at an H level, thereby to ground the output of the comparator CP3 connected to its collector, through its emitter; a diode D4 which has its cathode connected to the output terminals of the comparators CP1 and CP2 and has its anode connected to the output terminal of the comparator CP4, and which turns ON and invalidates the output of the comparator CP4 when the output of the comparator CP1 or CP2 is at an L level; and supply voltage pull-up resistors 323-325 which pull up the levels of the output terminals of the respective comparators CP1-CP4 in a plus direction.

Next, the operation of the prior-art apparatus configured as stated above will be described.

First, a constant-voltage supply voltage obtained by closing the key switch 8 and operating the Zener diode ZD3 is applied to individual supply voltage terminals e. As a result, divided voltages generated at a point C, the point E and a point B through which the voltage division resistors 310, 311, 317 and 312 are connected in series are inputted to the respective comparators CP1-CP3 as reference voltages.

Here, the operations of the comparators CP1 and CP2 will be described.

The point-A voltage and the reference voltages of the points C and B are compared by the respective comparators CP1 and CP2.

More specifically, when (the point-A voltage<the point-B voltage) holds, the output of the comparator CP2 becomes the L level, and the output of the comparator CP1 becomes the H level. Further, when (the point-B voltage<the point-A voltage<the point-C voltage) holds, both the outputs of the comparators CP1 and CP2 become the H level, and when (the point-C voltage<the point-A voltage) holds, the output of the comparator CP1 becomes the L level, and the output of the comparator CP2 becomes the H level.

In addition, when at least either of the outputs of the comparators CP1 and CP2 is the L level, the output of the comparator CP4 whose reference voltage is the point-A voltage correlative to the signal level from the external control unit is invalidated, and the output of the ordinary voltage controlling comparator CP3 whose reference voltage is the divided voltage based on the voltage division resistors 310-312 and 317 is validated.

Besides, when both the outputs of the comparators CP1 and CP2 are the H level, the output of the comparator CP3 is invalidated, and the output of the comparator CP4 is validated.

On account of the above operating states, in a case where the duty ratio of the duty signal which is the control signal inputted from the external control unit 4 to the voltage regulator 3 is set into a range from 0% to a duty ratio at which a voltage level is raised to the point-B voltage level being a first predetermined value, at the point A, (the point-A voltage<the point-B voltage) holds while the duty ratio is within the set range, and the output of the comparator CP2 becomes the L level, whereas the output of the comparator CP1 becomes the H level.

Besides, in a case where the duty ratio of the control signal is set into a range from a duty ratio at which the voltage level at the point A is brought to the point-C voltage level being a second predetermined value, to 100%, (the point-C voltage<the point-A voltage) holds while the duty ratio is within the set range, and the output of the comparator CP2 becomes the H level, whereas the output of the comparator CP1 becomes the L level.

As a result, the output of the comparator CP4 becomes invalid, and the output of the comparator CP3 is inputted to the transistor Q3 through the diode D5.

In addition, while the generated voltage does not arrive at an ordinary regulated voltage of 14.4 V and (the point-E voltage>the point-F voltage) holds, the transistor Q3 turns ON and causes a field current to flow through the field coil 102, thereby to continue a power generation operation and to charge the storage battery 5.

When the generated voltage arrives at 14.4 V, the output of the comparator CP3 becomes the L level and turns OFF the transistor Q3, thereby to lower the field current and to weaken the power generation output.

Further, when (the point-B voltage<the point-A voltage<the point-C voltage) holds, both the outputs of the comparators CP1 and CP2 become the H level and turn ON the transistor Q4, thereby to invalidate the output of the comparator CP3 and to input the output of the comparator CP4 to the transistor Q3 through the diode D6.

Accordingly, when the duty ratio of the control signal is changed so as to change the voltage level of the point A within a range of from, at least, the point-B voltage level to the point-C voltage level, the point-A voltage at a level corresponding to the duty ratio is inputted to the + input terminal of the comparator CP4, and the point-F voltage proportional to the generated voltage is inputted to the − input terminal thereof.

In addition, when the voltage level of the point-F voltage proportional to the generated voltage arrives at the point-A voltage level corresponding to the duty ratio, the comparator CP4 inputs the L level signal to the transistor Q3, thereby to turn OFF the transistor Q3.

Besides, when the duty ratio is changed to alter the level of the point-A voltage, the comparator CP4 outputs the L level signal to the transistor Q3 on condition that the point-F voltage arrives at the point-A voltage level corresponding to the altered duty ratio.

As stated above, according to the prior-art apparatus in FIG. 4, the regulated voltage of the generator can be set at any desired value by regulating the duty ratio of the duty signal which is the control signal inputted from the external control unit 4 to the voltage regulator 3.

Patent Document 1: U.S. Pat. No. 3,102,981 (FIGS. 2 and 3)

DISCLOSURE OF THE INVENTION

Problems that the Invention is to Solve

In that prior-art controller of the generator for the vehicle which is configured as stated above, there has been the problem that, in a case where the regulated voltage of the generator has become higher than in the ordinary mode in which the control signal from the external control unit is nonexistent, on account of the control signal, the current which flows through the switching element for performing the on/off control of the field current increases, so the switching element is apprehended to be destroyed.

Besides, there has been the problem that the temperature of the generator itself rises due to the increase of the field current, so the lifetime of the generator shortens.

This invention has been made in order to eliminate the problems of the prior-art apparatus as mentioned above, and it has for its object to obtain the controller of a generator for a vehicle, which prevents any excess current from flowing through a switching element for performing the on/off control of a field current and which prevents the destruction of the switching element, even in a case where the regulated voltage of the generator has become high.

Besides, it has for its object to obtain the controller of a generator for a vehicle, which can suppress the temperature rise of the generator attendant upon the increase of a field current and which prevents the lifetime of the generator from degrading, in a case where a regulated voltage is high.

Means for Solving the Problems

The controller of a generator for a vehicle according to this invention consists in a controller of an AC generator for a vehicle, including a voltage regulator which detects a terminal voltage of a storage battery that is charged with a rectification output of the AC generator having a field coil, which controls on/off of a field switching element on the basis of the detected voltage and a control signal that is inputted from an external control unit, and which performs on/off control of a field current that flows through the field coil, thereby to regulate an output voltage of the AC generator to a predetermined value; wherein a maximum duty factor limiting circuit which limits a maximum duty factor of the field switching element on the basis of a comparison between the control signal from the external control unit and a preset reference signal is disposed.

Besides, said maximum duty factor limiting circuit is configured including a first comparator which compares the control signal from the external control unit and a preset first reference signal, and a second comparator which compares the control signal from the external control unit and a preset second reference signal, wherein a limit starting point of the maximum duty factor is set by said first comparator, and a magnitude of the maximum duty factor is set by said second comparator.

ADVANTAGES OF THE INVENTION

According to the controller of a generator for a vehicle in this invention, even in a case where the regulated voltage of the generator has become high, any excess current can be prevented from flowing through a switching element which performs the on/off control of a field current, to prevent the destruction of the switching element.

Besides, the rationalization of the current capacity of the switching element is facilitated, and the configuration of the apparatus is permitted inexpensively.

Besides, in a case where the regulated voltage is high, the temperature rise of the generator attendant upon the increase of the field current can be suppressed, and it is permitted to suppress the degradation of the lifetime of the generator.

BEST MODE FOR CARRYING OUT THE INVENTION

Embodiment 1

FIG. 1 shows a configurational diagram of the controller of a generator for a vehicle according to Embodiment 1 of this invention. By the way, in the figure, the same numerals and signs as in FIG. 4 indicate identical or equivalent portions, and the detailed description of the overlapping portions shall be omitted.

Referring to FIG. 1, numerals 1, 2, 3 and 4 designate an AC generator, a rectifier, a voltage regulator and an external control unit in the same manner as in the prior-art apparatus in FIG. 4, respectively.

The controller of Embodiment 1 of this invention includes in addition to the above configuration of the prior art, a maximum duty factor limiting circuit 300 which limits the maximum duty factor of a transistor Q3 being a field switching element, in a case where a predetermined control signal input exists from the external control unit 4.

The maximum duty factor limiting circuit 300 includes a first comparator CP11 which compares the voltage of the point A of the voltage regulator 3 as indicates the voltage proportional to the duty signal of the external control unit 4 and the preset voltage of a point G.

Besides, it includes a second comparator CP12 which compares a triangular wave of constant cycle, formed of a supply voltage obtained by a Zener diode ZD3, and the voltage of the point A of the voltage regulator 3.

Incidentally, numerals 353 and 354 designate supply voltage pull-up resistors which pull up the levels of the output terminals of the respective comparators CP11 and CP12 in a plus direction.

Next, the operation of the maximum duty factor limiting circuit 300 will be described.

When the duty ratio of the control signal inputted from the external control unit 4 enlarges, also the voltage of the point A increases in proportion thereto, and the regulated voltage of the voltage regulator 3 exhibits a characteristic rising as shown in FIG. 2(*b*).

On this occasion, when the voltage of the point A becomes larger than that potential of the point G which has been previously set by resistors 351 and 352, the output of the first comparator CP11 changes-over from an H level to an L level, and a transistor Q12 turns OFF and thereby acts so as to validate the output of the second comparator CP12.

The second comparator CP12 compares the voltage of the point A and the triangular wave, whereby when the voltage of the point A is higher, a transistor Q11 is turned ON, and the transistor Q3 being the field switching element is turned OFF.

On this occasion, the operation is such that, as shown in FIG. 3, when the voltage of the point A is higher (the regulated voltage is higher), the proportion of the turn-OFF of the transistor Q3 is larger, and the maximum duty factor of the transistor Q3 being the field switching element exhibits a characteristic which becomes a smaller value when the regulated voltage is higher, as in FIG. 2(*a*).

Incidentally, the limit starting point of the maximum duty factor and the setting of the maximum duty factor of the field switching element as shown in FIG. 2 can be respectively altered with ease by the set value of the (+) potential in the first comparator CP11 and the formation of the triangular wave being the (−) input waveform of the second comparator CP12.

As stated above, according to the controller of the generator for the vehicle in Embodiment 1 of this invention, in the controller of a generator for a vehicle as includes a voltage regulator which performs the variable control of a regulated voltage with a control signal from an external control unit, a maximum duty factor limiting circuit which limits the maximum duty factor of a switching element that performs the on/off control of a field current, when the control signal is inputted from the external control unit, is disposed, so that even in a case where the regulated voltage of the generator has become high, any excess current can be prevented from flowing through the switching element for performing the on/off control of the field current, to prevent the destruction of the switching element.

Besides, the rationalization of the current capacity of the switching element is facilitated, and the configuration of the apparatus is permitted inexpensively.

Besides, even in a case where the regulated voltage is high, the temperature rise of the generator attendant upon the increase of the field current can be suppressed, and it is permitted to suppress the degradation of the lifetime of the generator.

Further, in the case where the regulated voltage is high, the enlargements of the output current and drive torque of the generator attendant upon the increase of the field current can be suppressed, and the designs of vehicular wirings, etc. which are connected from the generator to the electric load of the vehicle are facilitated.

DESCRIPTION OF REFERENCE NUMERALS AND SIGNS

Figure 1:
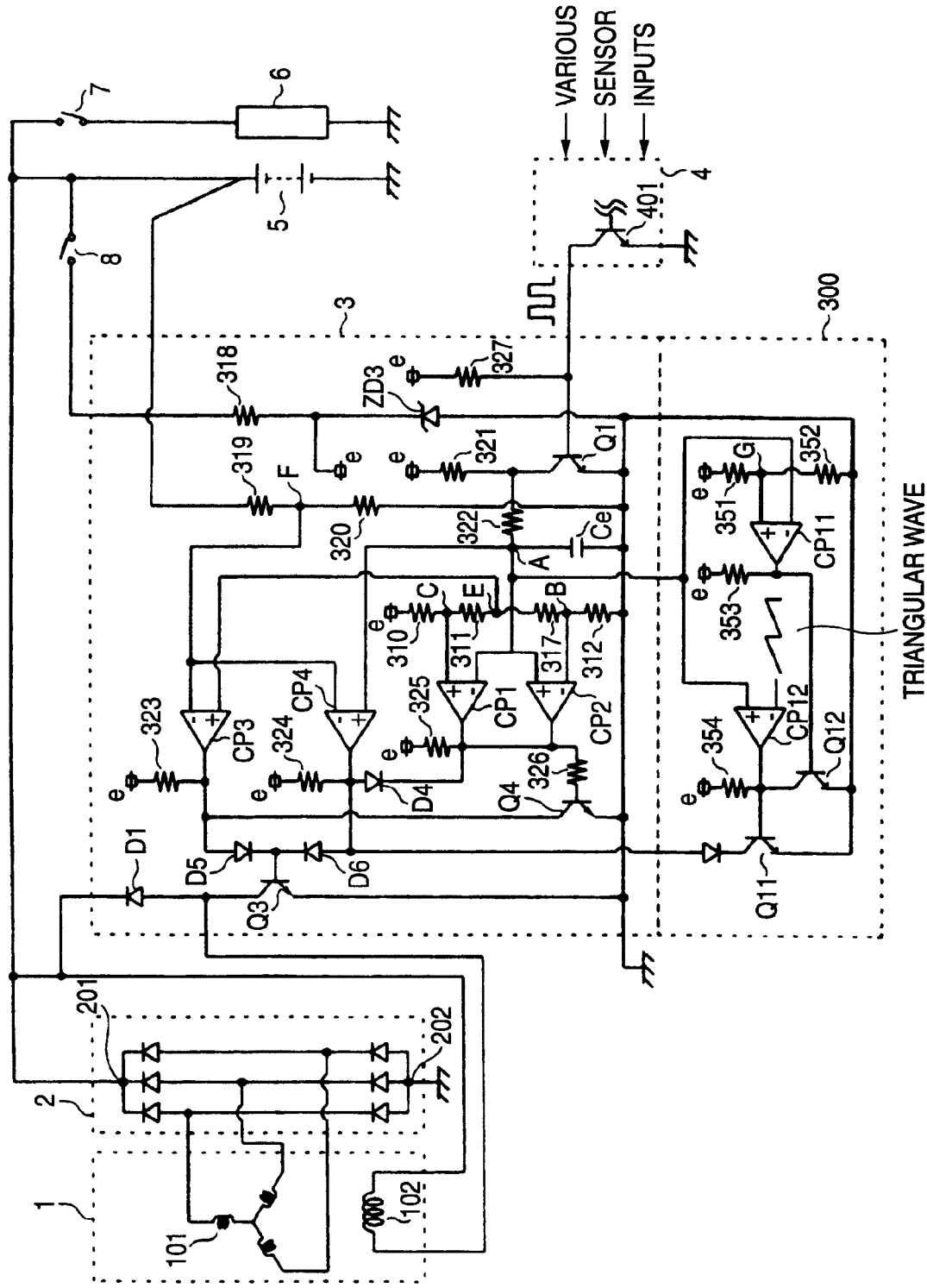
FIG. 1 It is a configurational diagram of the controller of a generator for a vehicle in Embodiment 1 of this invention.
Figure 2:
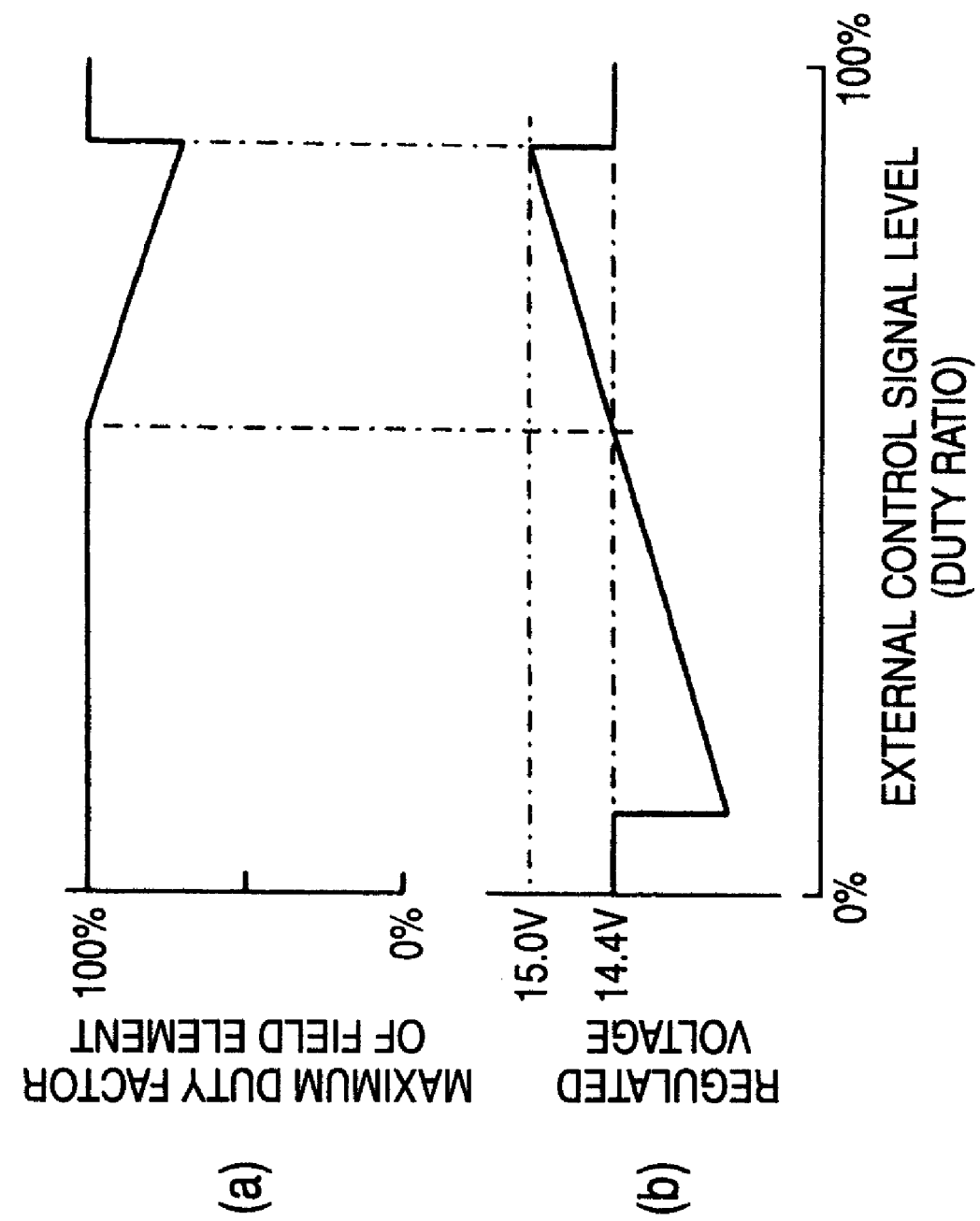
FIG. 2 It is a characteristic diagram showing examples of the regulated voltage and the field duty factor limiting value of a voltage regulator in Embodiment 1 of this invention.
Figure 3:
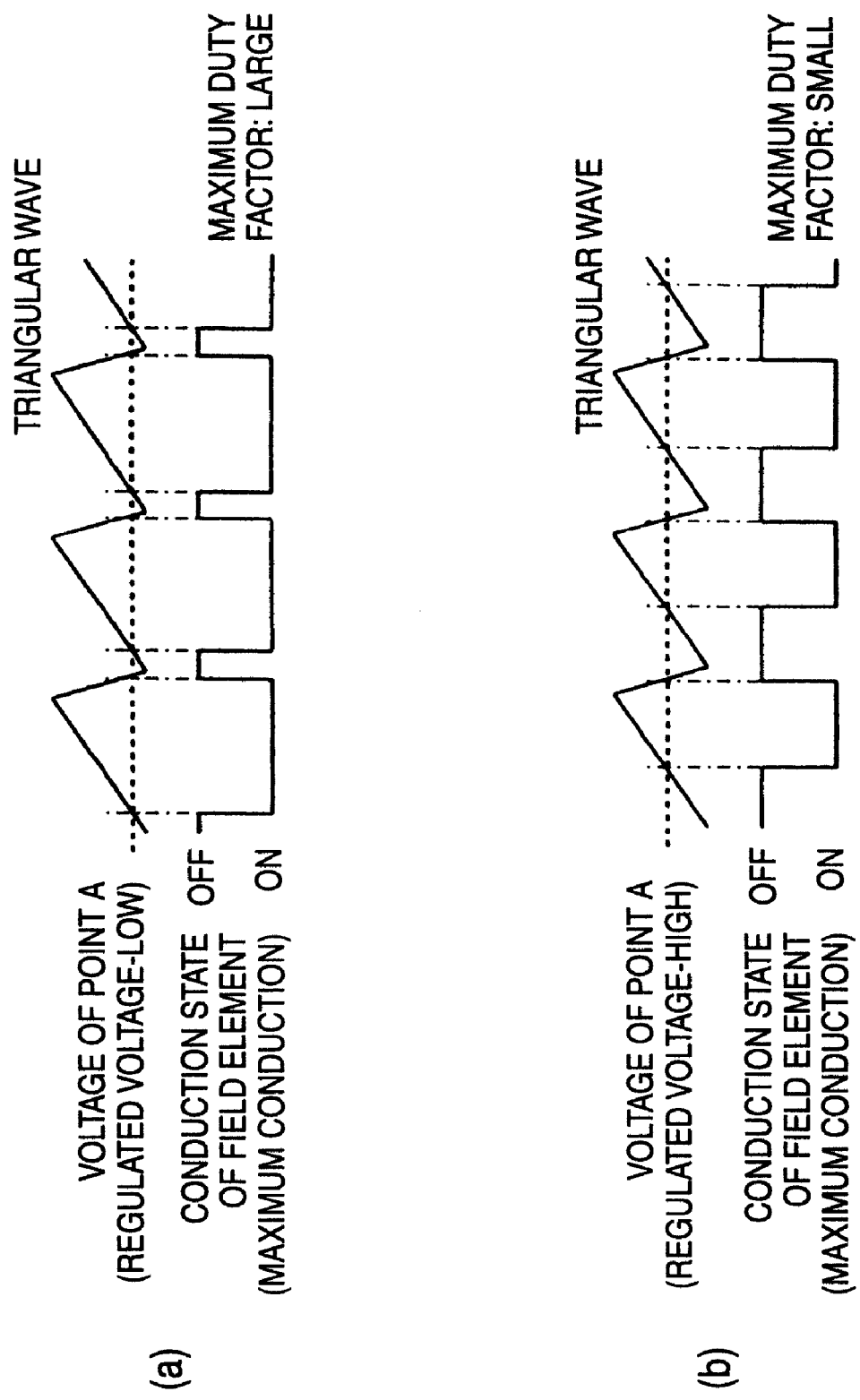
FIG. 3 It is an explanatory diagram showing the relationship between the magnitude of the regulated voltage and the conduction state of a field switching element in Embodiment 1 of this invention.
Figure 4:
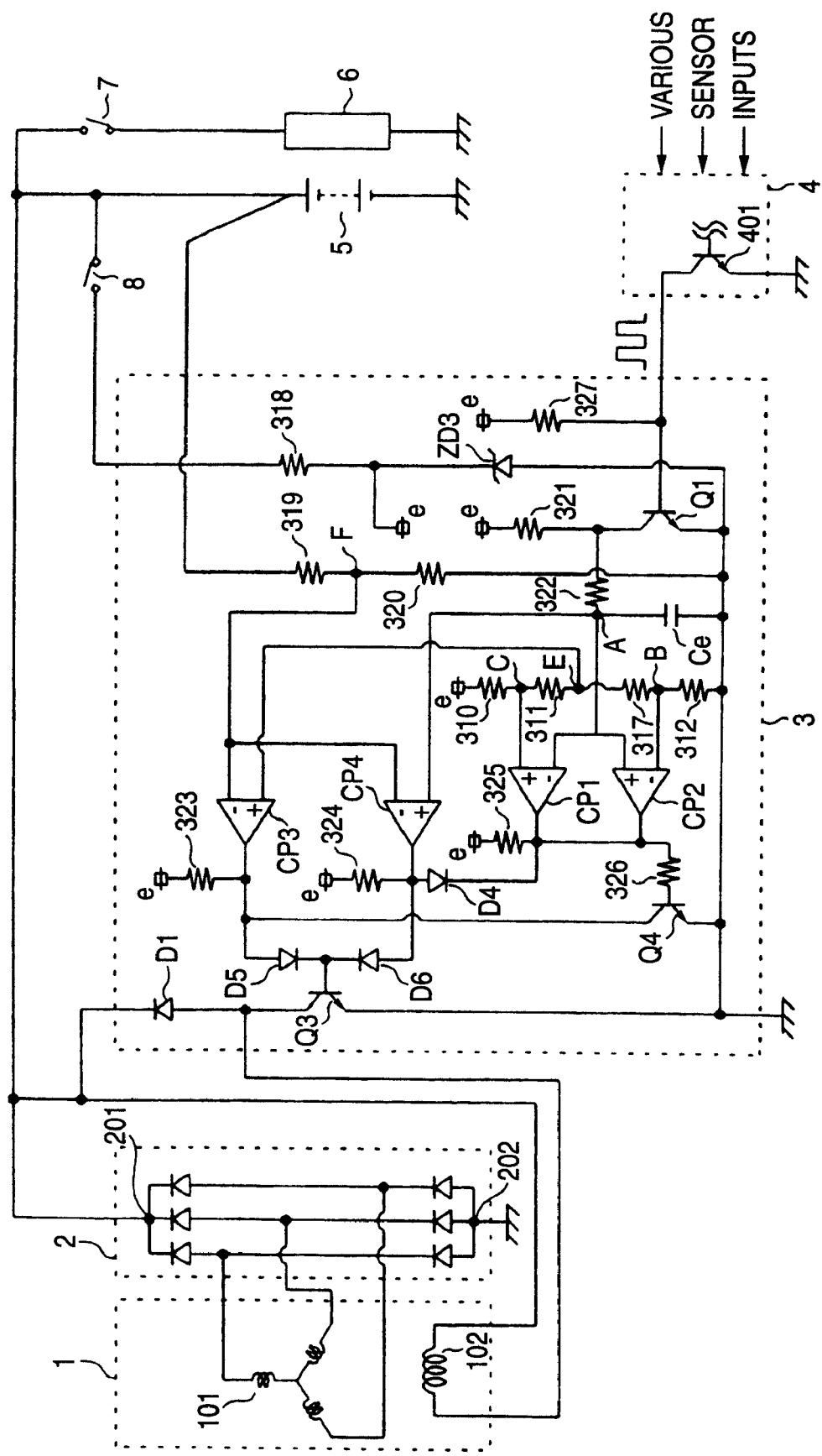
FIG. 4 It is a configurational diagram showing an example of the prior-art controller of a generator for a vehicle.

1: AC generator
2: rectifier
3: voltage regulator
4: external control unit
5: storage battery
6: electric load of vehicle
8: key switch
300: maximum duty factor limiting circuit
CP11: first comparator
CP12: second comparator

The invention claimed is:

1. In a controller of a generator for a vehicle, including a voltage regulator which performs on/off control of a field current by a switching element, thereby to regulate a generated voltage to a predetermined voltage, and which performs variable control of a regulated voltage with a control signal from an external control unit; a controller of a generator for a vehicle, characterized by disposing a maximum duty factor limiting circuit which limits a maximum duty factor of the switching element for performing the on/off control of the field current, when the control signal is inputted from the external control unit.

2. A controller of a generator for a vehicle as defined in claim 1, characterized in that, in a case where the regulated voltage is controlled so as to become higher than a predetermined voltage value, with the control signal from the external control unit, said maximum duty factor limiting circuit limits the maximum duty factor of the switching element for performing the on/off control of the field current.

3. A controller of a generator for a vehicle as defined in claim 2, characterized in that said maximum duty factor limiting circuit is set so that, as the regulated voltage becomes higher with the control signal from the external control unit, the maximum duty factor of the switching element may become smaller in inverse proportion to a magnitude of the regulated voltage.

4. In a controller of an AC generator for a vehicle, including a voltage regulator which detects a terminal voltage of a storage battery that is charged with a rectification output of the AC generator having a field coil, which controls on/off of a field switching element on the basis of the detected voltage and a control signal that is inputted from an external control unit, and which performs on/off control of a field current that flows through the field coil, thereby to regulate an output voltage of the AC generator to a predetermined value; a controller of an AC generator for a vehicle, characterized by disposing a maximum duty factor limiting circuit which limits a maximum duty factor of the field switching element on the basis of a comparison between the control signal from the external control unit and a preset reference signal.

5. A controller of an AC generator for a vehicle as defined in claim 4, characterized in that said maximum duty factor limiting circuit is configured including a first comparator which compares the control signal from the external control unit and a preset first reference signal, and a second comparator which compares the control signal from the external control unit and a preset second reference signal, wherein a limit starting point of the maximum duty factor is set by said first comparator, and a magnitude of the maximum duty factor is set by said second comparator.

6. A controller of an AC generator for a vehicle as defined in claim 4, characterized in that a control signal which is inputted to said maximum duty factor limiting circuit is a voltage signal which is proportional to a duty ratio of the control signal that is inputted from the external control unit.

7. A controller of an AC generator for a vehicle as defined in claim 5, characterized in that said first comparator is configured so as to compare the voltage signal which is proportional to the duty ratio of the control signal that is inputted from the external control unit and the first reference signal which is a preset voltage signal, and that said second comparator is configured so as to compare the voltage signal which is proportional to the duty ratio of the control signal that is inputted from the external control unit and the second reference signal which is a triangular wave of constant cycle.

* * * * *